(12) United States Patent
Young et al.

(10) Patent No.: US 8,035,995 B2
(45) Date of Patent: Oct. 11, 2011

(54) ACDC CONVERTER

(75) Inventors: George Young, Blackrock (IE); Garry Tomlins, Glounthaune (IE); Andrew Bernard Keogh, Glanmire (IE)

(73) Assignee: Texas Instruments Incorporated, Dallas, TX (US)

( * ) Notice: Subject to any disclaimer, the term of this patent is extended or adjusted under 35 U.S.C. 154(b) by 532 days.

(21) Appl. No.: 11/666,563

(22) PCT Filed: Oct. 27, 2005

(86) PCT No.: PCT/IE2005/000120
§ 371 (c)(1),
(2), (4) Date: Jul. 24, 2009

(87) PCT Pub. No.: WO2006/046220
PCT Pub. Date: May 4, 2006

(65) Prior Publication Data
US 2009/0279331 A1 Nov. 12, 2009

(30) Foreign Application Priority Data
Oct. 27, 2004 (IE) .................................. S2004/0715

(51) Int. Cl.
*H02M 3/335* (2006.01)
*H02M 7/5387* (2006.01)
(52) U.S. Cl. ........ 363/17; 363/127; 363/132; 363/56.05

(58) Field of Classification Search ................... 363/17, 363/132, 127, 53, 56.05
See application file for complete search history.

(56) References Cited

U.S. PATENT DOCUMENTS

| | | | | |
|---|---|---|---|---|
| 4,533,986 A * | 8/1985 | Jones | .............................. | 363/17 |
| 7,023,710 B2 * | 4/2006 | Durbaum et al. | ............... | 363/19 |
| 7,176,660 B2 * | 2/2007 | Usui et al. | ...................... | 323/207 |
| 7,558,083 B2 * | 7/2009 | Schlecht | .................... | 363/21.06 |
| 7,633,769 B2 * | 12/2009 | Toda et al. | ...................... | 363/26 |
| 7,796,408 B2 * | 9/2010 | Wang et al. | ................. | 363/21.06 |

* cited by examiner

*Primary Examiner* — Shawn Riley
(74) *Attorney, Agent, or Firm* — William B. Kempler; Wade J. Brady, III; Frederick J. Telecky, Jr.

(57) ABSTRACT

This invention relates to an ACDC converter (1) comprising a converter input (3) and a converter output (5), a pre-regulation stage (7) and a DC transformer stage (9) comprising a transformer input stage (11) and a transformer output stage (13). The transformer input stage comprises a double ended converter and there is further provided a controller (17) for providing a control signal to the double ended converter. The controller (17) operates the ACDC converter using burst mode control and by sending control signals comprising pulse sets that are designed to provide substantially zero net magnetising current in the double ended converter. The pre-regulation stage preferably comprises a buck converter which in turn also provides power factor correction to the input of the ACDC converter.

40 Claims, 3 Drawing Sheets

ACDC CONVERTER

RELATED APPLICATIONS

The subject application is a U.S. National Stage application that claims the priority of International Application No. PCT/IE2005/000120, filed on 27 Oct. 2005, which claims the priority of Irish National Application No.: S2004/0715, filed on 27 Oct. 2004.

This invention relates to an ACDC converter comprising a converter input and a converter output, a pre-regulation stage, a DC transformer stage comprising a transformer input stage and a transformer output stage, the transformer input stage further comprising a double-ended converter input stage, and a controller for providing a control signal to the double-ended converter input stage.

Over the last number of years, there have been many changes in the field of ACDC power converters. Many of these changes have been as a direct result of more stringent regulatory requirements imposed by governmental bodies. For the most part, there has been a drive towards providing more efficient ACDC converters and in particular, ACDC converters having a lower standby or no-load power loss. In order to meet these regulatory requirements, it has been found necessary to have stand-by or no-load losses as low as possible in power converters as it can have significant implications concerning the total running costs as well as safety aspects of a device incorporating such a power converter.

Furthermore, by operating the power converter at increased efficiency, the power converter is able to operate within a given set of energy conservation standards and is able to minimise heat generation in the power converter. This has the direct effect of reducing the requirement for cooling fluids such as air or water to be used in conjunction with the power converter. In addition to the requirements of high efficiency and lower no-load standby power losses, ACDC converters typically require some measure of power factor correction to essentially bring the input current waveform as close as possible to a sinusoidal waveform, in phase with the input voltage. The power converters will also often have to be capable of operating in dual mode, handling nominally sinusoidal mains/line voltages spanning Japanese low line requirements of approximately 100V through to European high line requirements of approximately 220 to 240V.

Therefore, ACDC converters typically have a requirement for Power Factor Correction (PFC), as well as a requirement for isolation and transformation of the voltage ratio. ACDC converters that are required to supply a continuous direct current output, are also required to provide some degree of energy storage as the AC line/mains supply will go through zero crossing of input voltage therefore necessitating some degree of energy storage. Heretofore, there have been numerous approaches to provide an ACDC converter that satisfies at least some of these requirements and in particular that have low standby power loss while remaining highly efficient. These approaches include single and multi stage converters and typically comprise boost pre-regulators followed by fly back, forward, Cuk, Sepic or other such approaches. However, there are problems associated with each of the known types of ACDC power converters and heretofore none of these ACDC converters has proven to be entirely suitable for providing low no-load power consumption with high output efficiency.

It is an object therefore of the present invention to provide an ACDC converter that overcomes at least some of these difficulties that is also relatively simple and inexpensive to manufacture.

STATEMENTS OF INVENTION

According to the invention there is provided an ACDC converter comprising a converter input and a converter output, a pre-regulation stage, a DC transformer stage comprising a transformer input stage and a transformer output stage, the transformer input stage further comprising a double-ended converter input stage, and a controller for providing a control signal to the double-ended converter input stage, characterised in that the controller operates using burst mode control and the control signal further comprises a pulse set designed to provide substantially zero net magnetising current in the double-ended converter.

By having such a converter, it is possible to gain more accurate control of the converters operation. It is also possible to achieve optimal transformer utilisation which improves the overall efficiency of the ACDC converter. Furthermore, it is no longer necessary to have the converter on for the entire time and therefore no-load switching losses and magnetic core losses can be reduced therefore greatly facilitating lower no-load power consumption.

In one embodiment of the invention there is provided an ACDC converter in which the controller further comprises a hysteretic controller operable to drop a pulse set from the control signal on detection of the ACDC converter output voltage being above a predetermined output voltage set-point or on detection that an over-current condition exists. This is seen as a particularly simple and relatively inexpensive way in which the control of the converter may be implemented. The hysteretic controller approach may be used to drop out pulse sets from the control signal. When the pulse set is dropped, the output synchronous rectifiers are turned off and there is no drive voltage. Therefore, the current in the output inductor is discharged through the body diodes of the output synchronous rectifiers. This method also facilitates current limiting in the device as it is possible to decide at the beginning of each pulse set time whether or not to execute that particular pulse set. The pulse set may be executed only if the voltage is below the output set point and if no over current condition is detected. This provides a simple way of enhanced control of the converter.

In another embodiment of the invention there is provided an ACDC converter in which the controller further comprises a Pulse Width Modulator (PWM) controller with means to determine the number of pulse sets within a PWM period comprising the control signal to determine the length of the control signal. This approach is slightly more complex than the hysteretic controller approach but may be implemented using a wide range of pulsed waveforms. When operating with a high frequency signal, it is possible to effectively "key" the signal on or off using the controller. This controller can be implemented using analog or digital techniques and the controller effectively determines the length of the pulse string. In this way, the controller provides a discrete set of pulses with the correct characteristics to ensure balance of the input drive circuitry.

In a further embodiment of the invention there is provided an ACDC converter in which the pulse set comprises a quarter cycle of one polarity followed by a half cycle of the reverse polarity followed by a further quarter cycle of the first polarity. In particular, it is envisaged that the pulse set comprises a quarter cycle of positive polarity followed by a half cycle of negative polarity, followed by a further quarter cycle of positive polarity. By having such a pulse set, there will be zero net magnetising current in the converter. Furthermore, these pulse sets may be concatenated with relative ease using appropriate logic to minimise glitches, to give a normal control wave form. Each of the pulse sets may be controlled with relative ease using either the hysteretic or the pulse width modulation approach.

In one embodiment of the invention there is provided an ACDC converter in which pulse sets of alternating polarities are dropped on each occasion on which a pulse set is dropped. By dropping pulse sets of alternating polarities on each occasion on which a pulse set is dropped, it is possible to overcome difficulties associated with dropping pulse sets which may be considered unduly long in the context of ripple introduced on the output capacitor.

In another embodiment of the invention there is provided an ACDC converter in which the pre-regulation stage is implemented using a buck converter. This is seen as a particularly useful ACDC converter and it is highly advantageous to be able to use a buck converter as the pre-regulation stage. Preferably, the buck converter pre-regulation stage (7) further acts as a Power Factor Correction (PFC) stage. By having a buck converter, it is possible to have a relatively low voltage on the bulk capacitor of typically between 60 to 90 Volts for universal line applications. It will be understood however that for applications operating under European line requirements only, it may be advantageous to operate with a bulk capacitor voltage closer to between typically 120V to 130V. These voltage ranges will provide an acceptable conduction angle and associated power factor correction in the range up to several hundred watts. Alternatively, configurations and embodiments of PFC stages may be provided other than the buck converter but the buck converter operates in a simple and efficient manner without the need for further PFC circuitry and is seen as particularly advantageous.

In a further embodiment of the invention there is provided an ACDC converter in which the buck converter is configured in an upside-down fashion with a ground referenced drive and ground referenced current sensing. This helps to save significant cost in the converter by obviating the need for high side current sensing and/or high side drive.

In one embodiment of the invention there is provided an ACDC converter in which there is further provided an auxiliary capacitor for hold-up enhancement. By having an auxiliary capacitor, it is possible to provide good hold-up enhancement of the ACDC converter. Therefore, the output of the ACDC converter can remain in regulation for some time after removal of the AC input supply. This is particularly advantageous in the instances of brown-out and the like. It is envisaged that the auxiliary capacitor may be charged using an auxiliary winding on either the buck inductor of the buck converter or alternatively may be charged using a charging current taken from a standby circuit. Either way, it is seen as highly advantageous to have the hold-up enhancement of the buck pre-regulator stage implemented in this manner.

In another embodiment of the invention there is provided an ACDC converter in which the controller operates the buck pre-regulator in burst mode or continuous mode using an appropriate control algorithm and depending on the load current. By using the configuration of ACDC power converter described, it is possible to operate the buck pre-regulator in continuous fashion without violating idle power guidelines. This has the advantage of providing a quasi-regulated input to the standby circuit which will be significantly more efficient as a direct result.

In a further embodiment of the invention there is provide an ACDC converter in which the buck converter feeds a bulk capacitor and in which there is provided an auxiliary boost converter to augment the bulk capacitor voltage. Alternatively, it is possible to provide a fly-back converter to augment the bulk capacitor voltage.

In one embodiment of the invention there is provided an ACDC converter in which the double-ended converter input stage comprises a half bridge. This is seen as a particularly simple and efficient construction of ACDC converter to provide that is robust and relatively inexpensive to manufacture. As an alternative to the half bridge it is possible to use either a full bridge or a push-pull converter with appropriate modifications.

In another embodiment of the invention there is provided an ACDC converter in which the transformer output stage further comprises a pair of output synchronous rectifiers. It is envisaged that these output synchronous rectifiers will be self driven using windings from the transformer. By having the pair of self driven synchronous rectifiers configured in this manner, the self driven synchronous rectifiers may be operated so that the stage is operated at substantially full duty cycle in a symmetrical fashion. In this way, a control pulse may be delivered alternately to the self driven synchronous rectifiers and this will allow for zero voltage switching to be maintained for the majority of the operation cycle and also allows the synchronous rectifiers to be kept on during most of the operating period. By having a relatively modest burst rate during light load operation conditions, minimum standby power losses are also achieved. Therefore, by combining the burst mode control with the synchronous rectifiers in this manner, it is possible to achieve low no-load power consumption as well as achieving high efficiency at high load conditions.

In a further embodiment of the invention there is provided an ACDC converter in which there is provided a clamp to prevent natural ringing in the windings causing parasitic turn-on of the output synchronous rectifiers. Preferably, the clamp may be provided by way of a switch on a winding of the DC transformer. This can also be used as an auxiliary power supply if desired. The clamp is implemented using a pair of diodes.

In one embodiment of the invention there is provided an ACDC converter in which there is provided an output inductor, the value of which is chosen to determine whether the current in the device is continuous or discontinuous. By choosing a suitable output inductor the desired mode of operation of the transformer may be achieved.

In another embodiment of the invention there is provided an ACDC converter in which the transformer ratio is chosen so that the second stage converter operates in nearly continuous duty cycle at the bottom levels of input voltage to this stage and drops pulse sets at higher levels of input voltage to this stage.

In a further embodiment of the invention there is provided an ACDC converter in which there is further provided an over-current latch. By having an over-current latch, this provides additional over-current protection to the ACDC converter and will provide backup to the fast current limit protection provided. This slow over-current latch will be able to obviate the difficulties associated with dissipation in the body diodes of the synchronous rectifiers which may be excessive under certain operating conditions and allows improved control of the converter.

In one embodiment of the invention there is provided an ACDC converter in which there is further provided a free-wheeling synchronous rectifier and the controller derives a blanking signal to derive a load-dependent drive signal for the free-wheeling synchronous rectifier. Under certain conditions of heavy load this may provide improved efficiency.

In another embodiment of the invention the controller is operated using a resonant derived pulse train. Alternatively, the controller may be operated using pulse steering techniques.

In a further embodiment of the invention there is provided a transformer for an ACDC converter comprising a primary winding, a primary clamping winding, a secondary power winding and a drive winding. By having such a transformer design, it is possible to provide a single transformer that will provide sufficient windings for complete operation of the circuit. The transformer will provide the drive windings for the synchronous output rectifiers as well as the power windings of the transformer output stage. Furthermore, the transformer will be able to provide a clamping winding to prevent ringing in the output synchronous rectifiers. Therefore, there is provided a very compact configuration of transformer that will be relatively economical and cost effective to produce. It is envisaged that the transformer could be further provided with additional transformer primary windings if desired.

It is envisaged that in certain embodiments, separate drive windings for output synchronous rectifiers may not be necessary and it is possible to drive the synchronous rectifiers directly from the power windings. In this case, there will be provided a transformer for an ACDC converter comprising a primary winding, a primary clamping winding and a secondary power winding.

In one embodiment of the invention there is provided a transformer for an ACDC converter in which the primary clamping winding further comprises a dual function primary auxiliary bias supply winding and clamping primary winding. This is seen as useful as the additional primary clamping windings may also operate as primary auxiliary bias supply windings if and when required to do so thereby obviating the need for excessive numbers of windings on the transformer. This will further help to keep the transformer as compact as possible.

In another embodiment of the invention there is provided a transformer for an ACDC converter in which there is provided a primary winding, a pair of dual function primary auxiliary bias supply windings and clamping primary windings, a pair of secondary power windings and a pair of drive windings. In this way, the transformer will have seven windings in total. Further additional primary windings could be provided if necessary. The transformer with the pair of auxiliary bias supply/clamping windings, the pair of drive windings and the pair of power windings will provide an excellent transformer design for the design of ACDC converter presented. This transformer will be both compact and efficient in use and will allow for flexible operation of the ACDC converter.

DETAILED DESCRIPTION OF THE INVENTION

The invention will now be more clearly understood from the following description of some embodiments thereof giving by way of example only with reference to the accompanying drawings in which.

Figure 1:
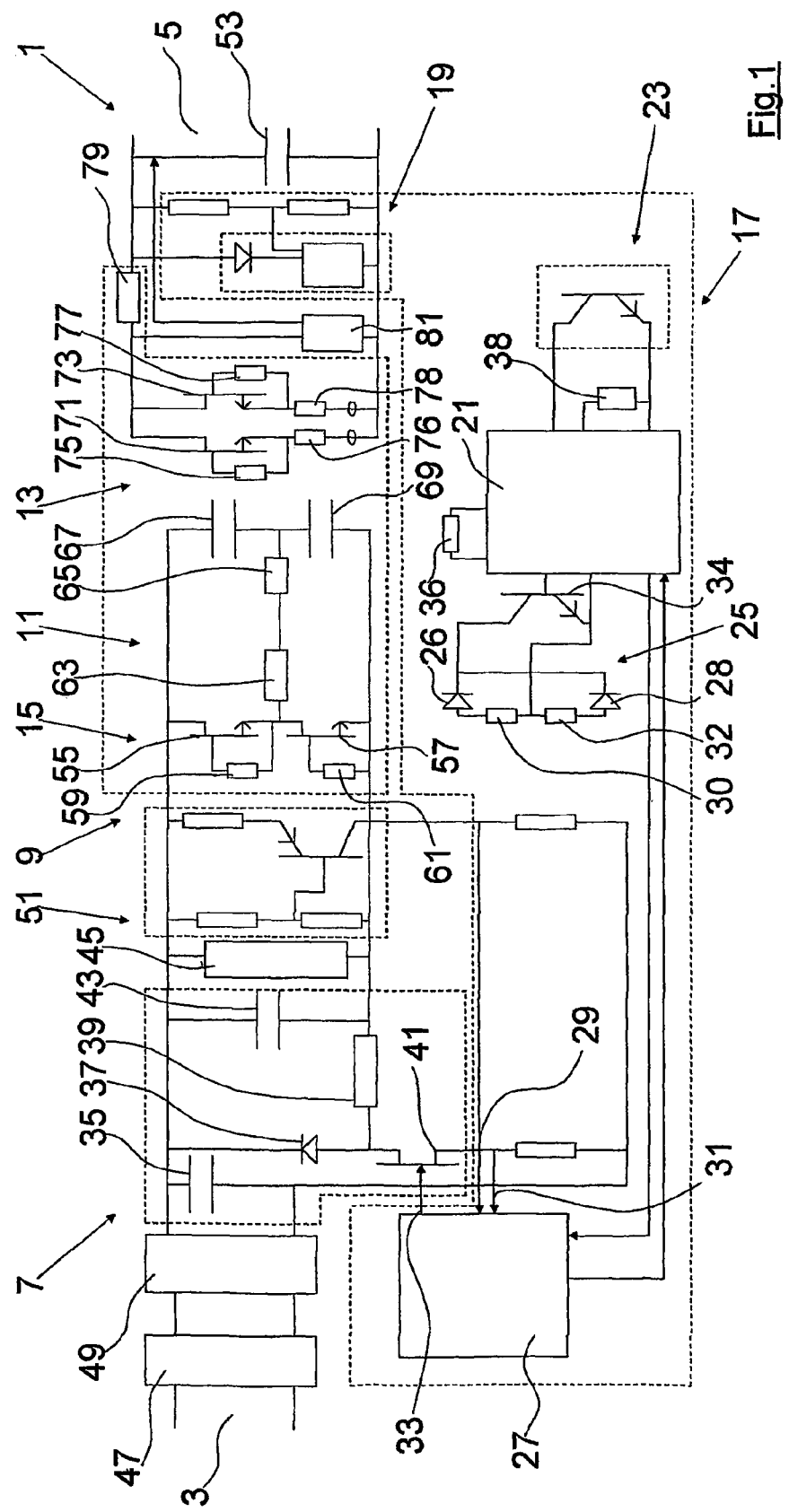
FIG. 1 is a diagrammatic view of an ACDC converter according to the present invention.

Referring to the drawings and initially to FIG. 1 thereof there is shown an ACDC converter, indicated generally by the reference numeral 1, comprising a converter input 3 and a converter output 5, a pre-regulation stage 7, a DC transformer stage 9 comprising a transformer input stage 11 and a transformer output stage 13, and a controller 17. The transformer input stage 11 further comprises a double-ended converter input stage 15, and the controller 17 provides a control signal to the double-ended converter input stage 15. The controller 17 further comprises a feedback optocoupler 19. The controller 17 is operable to drop a pulse set from the control signal on detection of the ACDC output voltage 5 being above a predetermined output voltage set point or on detection that an over-current condition exists. The controller 17 further comprises an isolation stage control 21 incorporating current sense signal circuitry 23 which is combined with the optocoupler circuitry 19 and clamping circuitry 25. The controller 17 additionally comprises a buck control 27 having a voltage sense input 29, a current sense input 31 and a pre-regulator control signal 33 which feeds the pre-regulation stage 7.

The pre-regulation stage further comprises a buck converter comprising a buck input capacitor 35, a buck diode 37, a buck inductor 39 and a buck switch 41. The buck converter feeds a bulk capacitor 43. The buck converter is configured in an upside-down fashion with a ground referenced drive and ground referenced current sensing. The buck converter further operates to provide a Power Factor Correction (PFC) function or stage to the ACDC converter. An auxiliary capacitor (not shown) is provided for hold-up enhancement of the circuit and may be connected to the input line in cases where the input should fail. The auxiliary capacitor (not shown) is charged using either an auxiliary winding (not shown) on the buck inductor 39 or alternatively is provided with a charging current from a standby circuit 45. The ACDC converter further comprises an input filter 47, an input bridge 49, a differential circuit 51 and an output capacitor 53.

The double-ended converter input stage 15 further comprises a half-bridge, which in turn comprises a pair of Field Effect Transistors (FET) 55, 57 each of which is provided with a driving winding 59, 61 respectively. The double-ended converter input stage 15 further comprises a transformer primary winding 63, a current sense winding 65 and a pair of capacitors 67, 69. The transformer output stage 13 further comprises a pair of self-driven output synchronous rectifiers 71, 73, each of which is provided with a driving winding 75, 77 respectively and a power winding 76, 78 5 respectively. The transformer output stage 13 further comprises an output inductor 79. A voltage clamp 81 is further provided.

Clamping circuit 25 operates to prevent natural ringing of the windings causing parasitic turn-on of the output synchronous rectifiers 71, 73. The clamping circuit 25 further comprises a pair of diodes 26, 28, a pair of auxiliary windings 30, 32, of the main transformer and a transistor 34. The isolation stage control 21 further incorporates a gate drive winding 36 and a current sense winding 38. In total, the transformer contains seven windings, the primary winding 63, the auxiliary windings 30, 32, the drive windings 75, 77, and the power windings 76, 78.

In use, the controller 17 provides a control signal to the double-ended converter input stage 15. The controller 17 operates using burst mode control and the control signal further comprises a pulse set designed to provide zero net magnetising current in the double-ended converter 15. Using the hysteretic controller 19, the controller 17 is able to drop a pulse set from the control signal on detection of the ACDC converter output voltage being above a pre-determined output voltage set point or on the detection that an over-current condition exists.

Figure 2:
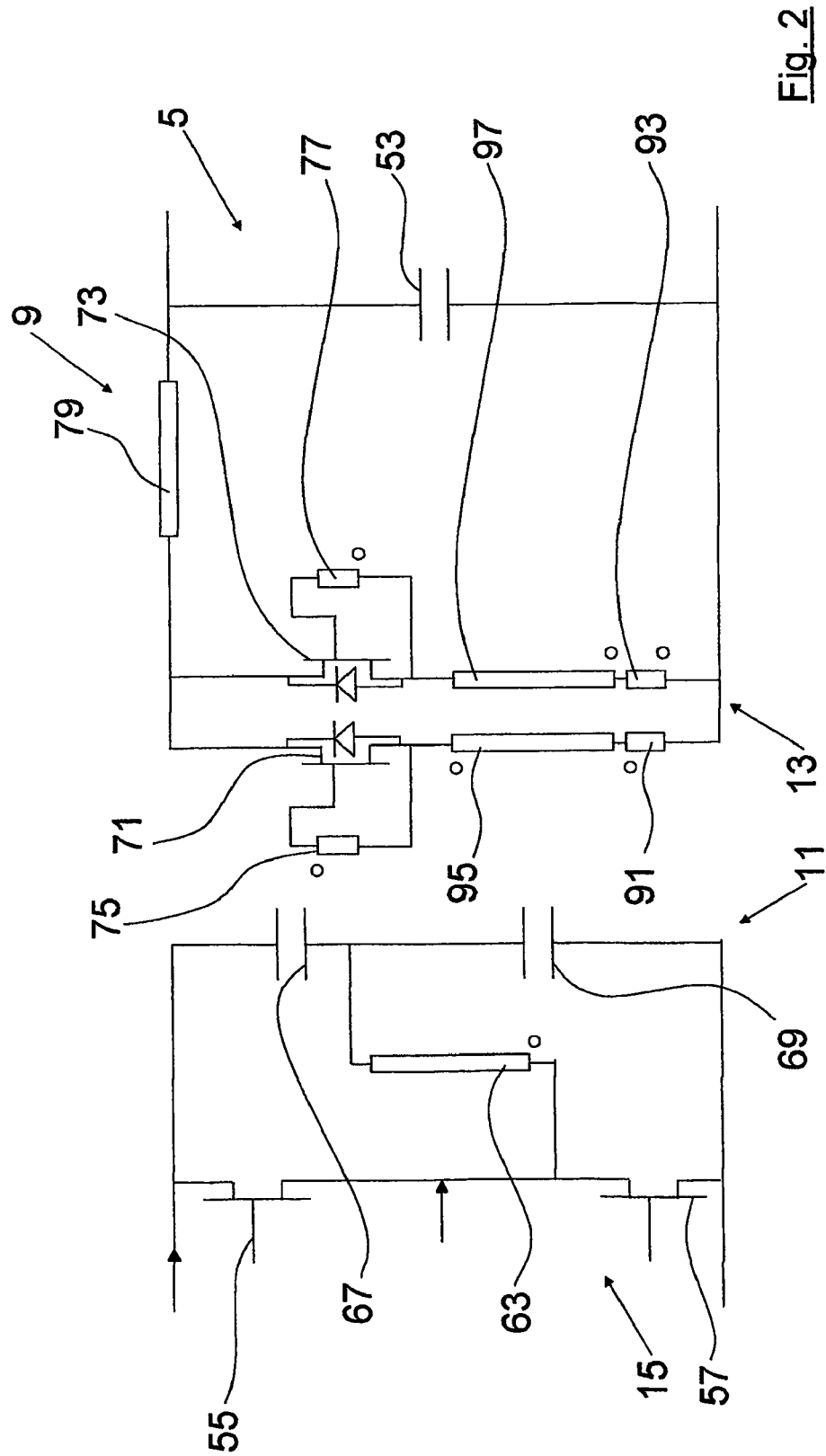
FIG. 2 is a diagrammatic view of an alternative transformer stage of the ACDC converter according to the present invention.

Referring now to FIG. 2 there is shown a more detailed view of an alternative embodiment of DC transformer for use in the present invention, where like parts have been given the same reference numerals as before. The DC transformer stage comprises a double-ended converter input stage 15 comprising a half bridge stage having a pair of self driven FETs 55, 57, a pair of capacitors 67, 69 and a primary winding 63. The transformer output stage 13 comprises a pair of output synchronous rectifiers 71, 73 each having a driving winding 75, 77 respectively. There is further provided an output inductor 79 and an output capacitor 53. The transformer output stage further comprises a plurality of power windings 91, 93, 95 and 97.

In use, the voltage across the bulk capacitor (not shown) is stored on the capacitors 67, 69 and the primary FETs 55, 57 are switched in a desired manner. The control of the primary side is such that stages run at substantially full duty cycle in a symmetrical fashion. Control is achieved by dropping control pulse sets. This is a form of integral cycle control which allows zero voltage switching to be maintained for most of the operating cycle and allows the synchronous rectifiers to be kept "on" during most of the operation period. Therefore, under light load conditions, the pulse rate can be quite modest thereby resulting in minimum power demand and low standby power losses.

During burst mode operation at light loads, the pulses need to be such that the net magnetising current contribution in the burst period is zero. In this way, the half bridge is switched in an integral cycle fashion using self-driven synchronous rectifiers. The value of the output inductor 79 will determine whether the half bridge stage operates in continuous or discontinuous mode. By having a larger inductor, this will cause continuous operation and by having a smaller value of inductor, this will provide discontinuous operation. By having integral cycle operation of the half bridge, zero voltage switching (ZVS) operation can be maintained along with self driven synchronous rectifier operation which will facilitate reducing the standby power losses at low voltages.

In the embodiment shown in FIG. 2, the desired output of the device may be 12V. Therefore, the dot end of winding 95 will be at approximately +13V. When the dot end of winding 95 is that +13V, the non-dot end of winding 97 will be at −13V. The synchronous rectifier 71 will be on and synchronous rectifier 73 will be off. When the dot end of winding 95 is at −13V, the non-dot end of winding 97 will be at +13V and synchronous rectifier 73 will be on whereas synchronous rectifier 71 will be off. In any event, the operation of the synchronous rectifiers will be readily apparent to those skilled in the art.

Figure 3:
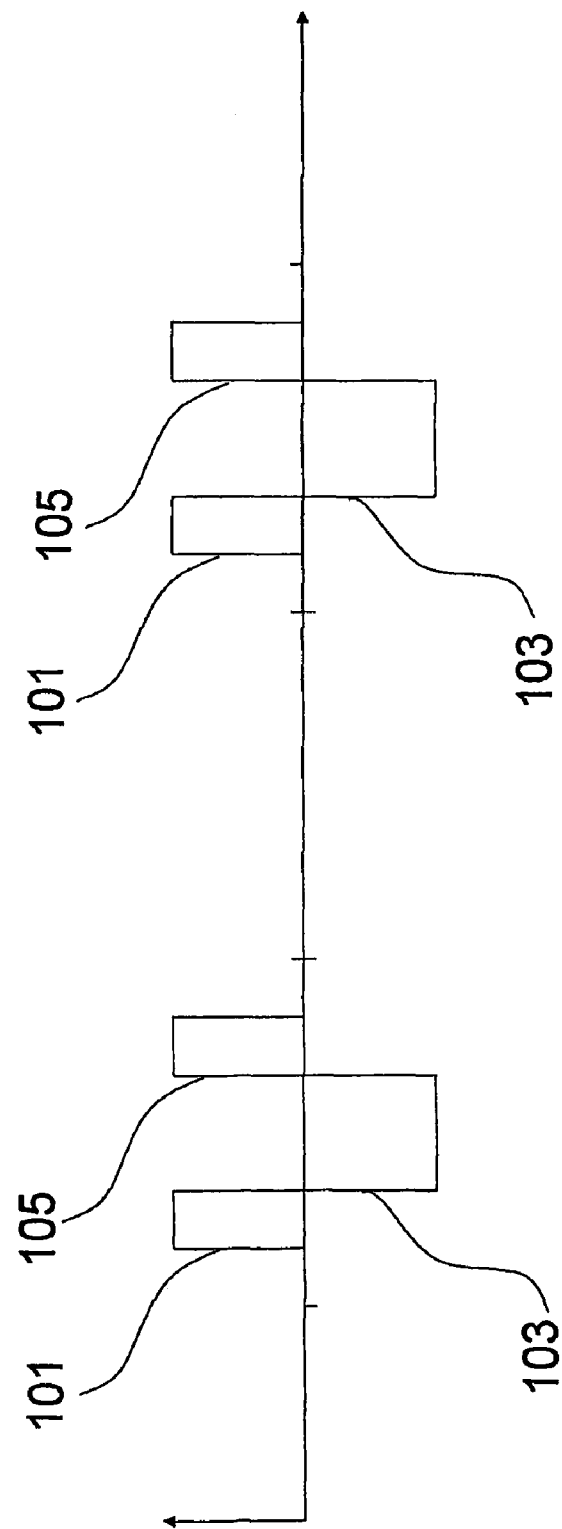
FIG. 3 is a diagrammatic representation of a pulse set that may be used in accordance with the present invention.

Referring to FIG. 3 of the drawings there is shown a pulse set suitable for application in the ACDC converter by the controller 17. The pulse set comprises a quarter cycle, 101, of positive supply feed followed by a half cycle, 103, of negative supply feed and in turn followed by another quarter cycle, 105, of positive supply feed. Such a pulse set will provide zero net magnetising current and therefore will not cause imbalance in the operation of the converter. These pulse sets may be concatenated with other pulse sets using appropriate logic to minimise glitches, to give a controlled waveform. The hysteretic control approach may then be used to drop pulse sets from the control waveform if and when appropriate. When the pulse set is dropped, the output synchronous rectifiers 71, 73 are off and there is no voltage applied and the output inductor current 79 is discharged through the body diodes (not shown) of the output synchronous rectifiers 71, 73. The clamp 81 prevents ringing in the windings from causing parasitic turn-on of the synchronous rectifiers 71, 73. This clamp is in fact implemented using a small switch on a transformer winding which may additionally be used as an auxiliary power supply if required. Instead of the waveform shown, it would also be possible to provide a waveform with the opposite polarity i.e. a quarter cycle of negative supply feed followed by a half cycle of positive supply feed followed by a further quarter cycle of negative supply feed. These are seen as very simple waveforms that will provide substantially zero net magnetising current and that can also be collated with similar waveforms to provide a control signal. Alternatively, more complex waveforms that operate in substantially the same way by providing substantially zero net magnetising current could be devised and used in the controller of the ACDC converter.

Instead of the hysteretic control approach it is possible to implement a more complex arrangement of controller. With such a high frequency signal, the control signal can effectively be keyed on or off by a controller. Therefore, it is possible to provide a pulse width modulator (PWM) controller which can be implemented using either analogue or digital techniques. This controller can determine the length of the pulse string provided to the circuitry. The operating frequency of the pulse width modulator (PWM) controller is typically an order of magnitude less than that of the input power switching stage and in this case the logic is such as to provide a discreet set of pulses with the right characteristics to ensure balance of the input drive circuitry. Furthermore, this approach can also apply to a wide range of pulsed waveforms. Specifically, the resonant derived pulse train and pulse steering techniques which limit the synchronous rectifiers body diode current and which are well suited to operation at higher frequencies may be used advantageously. When using the hysteretic or pulse width modulation controlled approach, essentially, a decision is taken at the start of each pulse set time as to whether to execute a pulse set or not.

A pulse set is executed only if the voltage is below the output set point and if no over-current condition is detected. It is normally appropriate to back up this fast current limit with a slower over-current latch in order to address the dissipation in the body diodes of synchronous rectifiers which may be excessive under such conditions. The approach of having a pulse set based current limit also allows for a fast and monotonic start-up. One problem that may arise with such a converter is the dropping of a pulse set may be unduly long in the context of ripple introduced on the output capacitor. For example, in the case of a converter operating at 125 KHz magnetic frequency, dropping a period of 8 µs may be considered excessive. This issue may be addressed by dropping pulse sets of alternating polarities on each occasion the pulse is dropped.

Irrespective of the pulse sets to be dropped, there is an issue of managing inductor current in the free wheeling period. As noted the inductor current will circulate through the body diodes of the output synchronous rectifiers. With a peak to peak voltage of typically 5% under optimal design conditions, the effective duty cycle can be 97.5% in terms of the ratio of pulse dropouts verses conduction period and optimising this approach using a control synchronous rectifier for switching may not be justified. If this is an issue, the control circuit will readily derive a blanking signal which can be used to derive a drive signal for a free wheeling synchronous rectifier. As a practical matter, it is probably preferred to limit enhancement of the free wheeling synchronous rectifier to conditions of heavier load as otherwise issues may arise with a reverse power flow.

In the embodiments described, a buck converter has been used as the pre-regulator stage, and more specifically, as the Power Factor Correction (PFC) pre-regulation stage. The buck converter applies a voltage across a bulk capacitor which has been converted from the line voltage which in many cases would be the main supply. The buck converter is implemented in an upside-down fashion providing a ground referenced drive and ground referenced current sensing. An auxiliary capacitor may be provided to provide hold-up enhancement to the buck stage so that the output can remain in regulation for some time after removal of the AC input supply. However, it is known that the volumetric efficiency of energy storage and capacitors with lower voltage ratings i.e. in the region of under 200V, is inferior to those operating with ratings as used in conventional universal line applications i.e. typically 400 or 450V rated parts. Therefore, the auxiliary capacitor may frequently be charged using an auxiliary winding on the buck inductor 39 or the standby supply circuit 45 may be used to provide a charging current. When the input line voltage drops below an acceptable level where output regulation is assured (ideally with some buffer zone such that the output voltage is unaffected), the hold-up enhancement capacitor may be connected to the input and it thus supplants the input voltage to give the required hold-up performance.

The buck converter cannot draw power from the main line under conditions where the input voltage of the mains lines supply is less than the voltage across the bulk capacitor energy storage device, leading to a discontinuous draw of current. This can be augmented by using an auxiliary boost or a fly back converter. The bulk capacitor voltage will typically be between 60V and 90V. A lower limit increases conduction angle and thus provides greater approximation to a sinusoidal current but at the cost of increased stress on switching devices. A high value will limit the conduction angle which may be an issue as power levels increase. It is possible to use trapezoidal waveforms which will give good power factor correction up to several hundred watts and usage of a truncated sinusoid may give better performance at higher powers. The output of the buck stage thus consists of a DC voltage typically between 60V to 90V in the case of universal line applications, upon which is superimposed a ripple voltage of typically 5% pk-pk at full load depending on the relative capacitors value. A significant advantage of the configuration of PFC buck pre-regulator stage is that the buck stage can also be left on continually in burst mode without violating no-load power guidelines. Standby supplies can be made significantly more efficient as they now operate from a quasi-regulated input. This was heretofore not possible with the existing designs of ACDC power converters.

One other approach that may be used with the ACDC converter is to use the rectified AC line voltage to derive the buck PFC stage controller reference signal, rather than a fixed dc reference signal. The reference derived from the AC line voltage may be appropriately scaled down, clamped and in some instances offset from zero to allow input current waveshape programming to follow a desired trapezoidal program so as to provide low harmonic content, high power factor correction and low buck power factor correction stage current stresses. Furthermore, in implementations where buck pfc stage maximum duty cycle is limited to a level less than 100%, this can help to ensure that the error amp (not shown) does not saturate at the AC line voltage crossovers. This could prove highly advantageous particularly at higher power levels where leading edge line current transients could lead to conducted EMC issues.

One of the challenges of ACDC power converters is to provide a highly efficient converter. It is well known that the most efficient type of converter is usually one which makes best usage of switching devices and magnetic elements. One approach that has been used in industry standard pulse converters, otherwise known as DC transformers, typically has a double-ended input stage, most commonly a half bridge operated at close to 50% duty cycle for each stage, with a small dead-time or small overlap, depending on whether it is a voltage fed or a current fed stage respectively. The transformer secondary can use a full bridge of rectifying elements, a current doubler type section or a centre tapped arrangement. This configuration also allows easy direct drive of synchronous rectifiers from the transformer winding. A measure of resonance on the transitions can be achieved, thereby reducing switching losses over a large part of the operation range. The leakage inductance between primary and secondary can also be instrumental in reducing the reverse recovery current in the body diodes of the synchronous rectifiers. However, such a stage operates with minimal control and provides a normally fixed ratio between input and output voltages. Ripple on the buck capacitor is replicated on the output voltage. This design further has limited ability to cope with short circuit conditions and other fault conditions. Finally, such a converter is "on" the whole time and therefore no-load switching losses or magnetic core losses can become quite significant, thus causing difficultly in meeting requirements concerning no-load power. Therefore, although providing a highly efficient converter, the converter suffers from the disadvantage of having significant no-load power losses.

It is possible to overcome these difficulties by operating this stage as described in the specification in a burst mode fashion with a pulse train that ensures no net magnetising current. This may be achieved with careful selection of a pulse set that produces substantially no or minimal net magnetising current and that also may be concatenated with other pulse sets to provide a control signal and that would further allow dropping of pulse sets to facilitate control. It is possible to envisage a pulse train which gives a minimal level of net magnetising current which gives rise to a maximum level of imbalance in the half bridge capacitors of less than 10% of the input voltage, or which results in a net magnetising current substantially below the saturation limit in the case of deployment of push-pull or full bridge transformer implementations. These would provide adequate levels of control of the circuitry.

In another aspect of the present invention, the DC transformer control circuit resides on the secondary side of the transformer. Throughout the specification, the DC transformer control circuit has been described on the primary side but this is not necessarily the case. It is possible to provide this control with the gate drive signals to the primary side switches appropriately coupled across the isolation barrier. This could be achieved by using a separate gate drive transformer to send the drive signals from the secondary control circuit to the gates of the primary switches. Alternatively, the gate signal may be transferred by high speed opto-coupler, or other means.

In this specification, there is also disclosed a unique construction of transformer for use with a ACDC converter that comprises a main primary winding, a pair of secondary drive windings, a pair of secondary power windings and a pair of primary clamping Windings. Additional primary windings may be provide if desired. By having such a transformer, the windings required for the ACDC converter can be provided with a single transformer in a compact manner thereby saving space on a circuit and reducing the time taken to construct a board containing such a feature.

Finally, it will be understood that the double-ended converter input stage may comprise a half bridge or a full bridge or alternatively may comprise a push-pull converter. The transformer ratio may be carefully chosen so that the ACDC converter 1 operates in nearly continuous duty cycle at the bottom levels of input voltage to this stage and drops a pulse set with higher levels input voltage.

In this specification the terms "comprise, comprises, comprised and comprising" and the terms "include, includes, included and including" are all deemed totally interchangeable and should be afforded the widest possible interpretation.

The invention is in no way limited to the embodiment hereinbefore described but may be varied in both construction and detail within the scope of the claims.

The invention claimed is:

1. An ACDC converter comprising a converter input and a converter output, a pre-regulation stage, a DC transformer stage comprising a transformer input stage and a transformer output stage, the transformer input stage further comprising a double-ended converter input stage, and a controller for providing a control signal to the double-ended converter input stage, and in which the controller operates using burst mode control and the control signal further comprises a pulse set that provides substantially zero net magnetising current in the double-ended converter wherein the controller further comprises a hysteretic controller operable to drop a pulse set from the control signal on detection of the ACDC converter output voltage being above a predetermined output voltage set-point.

2. The ACDC converter as claimed in claim 1 in which the controller further comprises a hysteretic controller operable to drop a pulse set from the control signal on detection that an over-current condition exists.

3. The ACDC converter as claimed in claim 1 in which the controller further comprises a Pulse Width Modulator (PWM) controller with means to determine the number of pulse sets within a PWM period comprising the control signal to determine the length of the control signal.

4. The ACDC converter as claimed in claim 1 in which the pulse set comprises a quarter cycle of one polarity followed by a half cycle of the reverse polarity followed by a further quarter cycle of the first polarity.

5. The ACDC converter as claimed in claim 4 in which the pulse set comprises a quarter cycle of positive polarity followed by a half cycle of negative polarity followed by a further quarter cycle of positive polarity.

6. The ACDC converter as claimed in claim 1 in which pulse sets of alternating polarities are dropped on each occasion on which a pulse set is dropped.

7. The ACDC converter as claimed in claim 2 in which pulse sets of alternating polarities are dropped on each occasion on which a pulse set is dropped.

8. An ACDC converter comprising a converter input and a converter output, a pre-regulation stage, a DC transformer stage comprising a transformer input stage and a transformer output stage, the transformer input stage further comprising a double-ended converter input stage, and a controller for providing a control signal to the double-ended converter input stage, and in which the controller operates using burst mode control and the control signal further comprises a pulse set that provides substantially zero net magnetising current in the double-ended converter wherein the pre-regulation stage is implemented using a buck converter.

9. The ACDC converter as claimed in claim 8 in which the buck converter pre-regulation stage further acts as a Power Factor Correction (PFC) stage.

10. The ACDC converter as claimed in claim 8 in which the buck converter is configured in an upside-down fashion with a ground referenced drive and ground referenced current sensing.

11. The ACDC converter as claimed in claim 8 in which there is further provided an auxiliary capacitor for hold-up enhancement.

12. The ACDC converter as claimed in claim 11 in which the auxiliary capacitor is charged using an auxiliary winding on a buck inductor of the buck converter.

13. The ACDC converter as claimed in claim 11 in which there is provided a standby circuit and the standby circuit provides a charging current to charge the auxiliary capacitor.

14. The ACDC converter as claimed in claim 8 in which the controller operates the buck pre-regulator in one of burst mode and continuous mode using an appropriate control algorithm depending on the load current.

15. The ACDC converter as claimed in claim 8 in which the buck converter feeds a bulk capacitor and in which there is provided an auxiliary boost converter to augment the bulk capacitor voltage.

16. The ACDC converter as claimed in claim 8 in which the buck converter feeds a bulk capacitor and in which there is provided a flyback converter to augment the bulk capacitor voltage.

17. The ACDC converter as claimed in claim 1 in which the double-ended converter input stage further comprises a half bridge.

18. The ACDC converter as claimed in claim 1 in which the double-ended converter input stage further comprises a full bridge.

19. The ACDC converter as claimed in claim 1 in which the double-ended converter input stage further comprises a push-pull converter.

20. The ACDC converter as claimed in claim 1 in which the transformer output stage further comprises a pair of output synchronous rectifiers.

21. The ACDC converter as claimed in claim 20 in which the output synchronous rectifiers are self driven using a plurality of windings from the transformer.

22. The ACDC converter as claimed in claim 20 in which there is provided a clamp to prevent natural ringing in a winding of the transformer causing parasitic turn-on of the output synchronous rectifiers.

23. The ACDC converter as claimed in claim 22 in which the clamp is provided by way of a switch on a winding of the DC transformer.

24. The ACDC converter as claimed in claim 1 in which there is provided an output inductor, the value of which is chosen to determine whether the current in the device is continuous or discontinuous.

25. The ACDC converter as claimed in claim 1 in which the transformer ratio is chosen so that the second stage converter operates in nearly continuous duty cycle at the bottom levels of input voltage and drops pulse sets at higher levels of input voltage 26. The ACDC converter as claimed in claim 1 in which there is further provided an over-current latch.

27. The ACDC converter as claimed in claim 1 in which there is further provided a free-wheeling synchronous rectifier and the controller derives a blanking signal to derive a load-dependent drive signal for the free-wheeling synchronous rectifier.

28. The ACDC converter as claimed in claim 1 in which the controller is operated using a resonant derived pulse train.

29. The ACDC converter as claimed in claim 1 in which the controller is operated using pulse-steering techniques.

30. The ACDC converter of claim 1, wherein the transformer comprises a primary winding, a primary clamping winding, and a secondary power winding.

31. The transformer for an ACDC converter as claimed in claim 30 in which the transformer further comprises a drive winding.

32. The transformer for an ACDC converter as claimed in claim 30 in which the primary clamping winding further comprises a dual function primary auxiliary bias supply winding and clamping primary winding.

33. The transformer for an ACDC converter as claimed in claim 31 in which there is provided the primary winding, a pair of dual function primary auxiliary bias supply winding and clamping primary windings, a pair of secondary power windings and a pair of drive windings.

34. An ACDC converter comprising a converter input and a converter output, a pre-regulation stage, a DC transformer stage comprising a transformer input stage and a transformer output stage, the transformer input stage further comprising a double-ended converter input stage, and a controller for providing a control signal to the double-ended converter input stage, and in which the controller operates using burst mode control and the control signal further comprises a pulse set that provides substantially zero net magnetising current in the double-ended converter, the pulse set comprising a quarter cycle of one polarity followed by a half cycle of the reverse polarity followed by a further quarter cycle of the first polarity.

35. The ACDC converter as claimed in claim 34 in which the controller further comprises a hysteretic controller operable to drop a pulse set from the control signal on detection of the ACDC converter output voltage being above a predetermined output voltage set-point.

36. The ACDC converter as claimed in claim 34 in which the controller further comprises a hysteretic controller operable to drop a pulse set from the control signal on detection that an over-current condition exists.

37. The ACDC converter as claimed in claim 34 in which the controller further comprises a Pulse Width Modulator (PWM) controller with means to determine the number of pulse sets within a PWM period comprising the control signal to determine the length of the control signal.

38. The ACDC converter as claimed in claim 35 in which pulse sets of alternating polarities are dropped on each occasion on which a pulse set is dropped.

39. The ACDC converter as claimed in claim 36 in which pulse sets of alternating polarities are dropped on each occasion on which a pulse set is dropped.

40. The ACDC converter as claimed in claim 34 in which the pre-regulation stage is implemented using a buck converter, the buck converter pre-regulation stage operating as a Power Factor Correction (PFC) stage and in which the buck converter is configured in an upside-down fashion with a ground referenced drive and ground referenced current sensing.

* * * * *